United States Patent [19]

Schweitzer, III

[11] Patent Number: 5,367,426
[45] Date of Patent: Nov. 22, 1994

[54] DISTANCE RELAY WITH LOAD ENCROACHMENT PROTECTION, FOR USE WITH POWER TRANSMISSION LINES

[75] Inventor: Edmund O. Schweitzer, III, Pullman, Wash.

[73] Assignee: Schweitzer Engineering Laboratories, Inc., Pullman, Wash.

[21] Appl. No.: 960,763

[22] Filed: Oct. 14, 1992

[51] Int. Cl.$^5$ .............................................. H02H 3/26
[52] U.S. Cl. ...................................... 361/80; 324/522
[58] Field of Search .......................... 361/42, 44–50, 361/54–57, 60–66, 77, 78, 79, 80, 81, 82, 84, 85, 187, 188; 324/83 Q, 512, 522, 525

[56] References Cited

U.S. PATENT DOCUMENTS 4,092,641 5/1978 Williams ................................. 361/80
4,821,137 4/1989 Wilkinson ............................. 361/80
4,896,241 1/1990 Li et al. ................................. 361/66

Primary Examiner—Jeffrey A. Gaffin
Assistant Examiner—Ronald W. Leja
Attorney, Agent, or Firm—Jensen & Puntigam

[57] ABSTRACT

Voltage and current on a power transmission line are first obtained, filtered and converted to digital representations. The positive sequence components of the voltage and current are determined and the impedance at the relay is then calculated from those positive sequence voltages and currents. The positive sequence impedance is converted into a magnitude and phase angle representation and then compared against a load pattern which is also represented by magnitude and phase angle representations. If the calculated impedance at the relay is within the load impedance pattern, the distance relay is prevented, i.e. blocked, from sending an output signal to trip a circuit breaker protecting the transmission line.

18 Claims, 2 Drawing Sheets

DISTANCE RELAY WITH LOAD ENCROACHMENT PROTECTION, FOR USE WITH POWER TRANSMISSION LINES

TECHNICAL FIELD

This invention relates generally to distance relays designed for protection of power transmission lines, and more particularly, concerns such relays which are designed to avoid the load impedance in fault determinations.

BACKGROUND OF THE INVENTION

Distance relays are typically used to protect power transmission lines by detecting short circuit faults on the line and thereafter initiating the tripping of circuit breakers associated with the particular portion of the line covered by the relay.

A transmission line has a known impedance, which increases with the length of the line. A distance relay has a pre-established impedance setting, which determines the size of the relay's impedance characteristic, which is typically in the form of a circle in the impedance plane, and which is matched to the length of that portion of the line covered by the relay. The relay is capable of rapidly detecting faults on the transmission line, indicated by a drop in impedance of the line, by detecting when the impedance of the line is inside the impedance characteristic of the relay, i.e. inside the impedance plane circle.

The load which is serviced by the transmission line also appears to the distance relay as an impedance. The load impedance decreases as the load increases in normal operation of the power system. Typically, the load impedance remains large enough that it does not impinge on, i.e. "encroach" upon, the impedance characteristic (the circle) of the relay. In certain situations, however, the load is large enough (and hence the load impedance small enough) that it does overlap the relay characteristic. This is referred to generally as load encroachment. If it occurs, the distance relay will detect the reduced load impedance as being within the characteristic circle, and, not knowing that the reduced impedance determination is actually load, will identify it as indicating a fault condition on the line, and will trip the circuit breaker associated with that portion of the line, disrupting service unnecessarily to the heavily loaded line. This of course is highly undesirable, since no fault condition is in fact present on the line, i.e. it is a false trip, which is undesirable at any time, and since the false trip occurs at a very inconvenient time in the operation of the power system, when the demand for power is very high.

The conventional, universal solution to load encroachment is to modify the relay characteristic in some manner to exclude the load from the coverage of the characteristic. One approach is to use a mho relay element, which has a somewhat different reach than a conventional impedance circle. This sometimes will be sufficient to avoid the load. In those situations where the load still encroaches upon the mho characteristic, however, other more specialized techniques are necessary. In one technique, a portion of the mho circle is cut off by a blinder element. In another technique, the mho circle is specially configured to avoid the encroaching load pattern by using multiple circles. In still another technique, fancy patterns are used to avoid the load.

All of the conventional techniques attempt to shape the impedance characteristic to avoid the load. There are disadvantages to this approach, primarily in the resulting desensitization of the relay to faults which appear outside of the modified characteristic circle but which would have otherwise been inside the circle. It is difficult to match the characteristic to the load with any precision. Also, the more complex impedance characteristic shapes are relatively hard to generate by an operator through the relay settings. There is a relatively complex relationship between the relay settings and the transmission line loading conditions, which contributes to this problem.

SUMMARY OF THE INVENTION

Accordingly, the invention is a system and a method for preventing a protective relay useful in protecting power transmission lines from indicating a fault on the transmission line in response to load, comprising: measuring voltage and current on the transmission line; calculating impedance at the relay location on the transmission line from the measured voltage and current; determining a pattern of load impedance on the transmission line relative to the relay; comparing the calculated impedance at the relay location against a test pattern at least substantially similar to the load impedance pattern; and means for blocking the output of the relay which is otherwise indicative of a fault on the transmission line and which is used to trip a circuit breaker if the calculated impedance is within the test pattern.

BEST MODE FOR CARRYING OUT THE INVENTION

Figure 1:
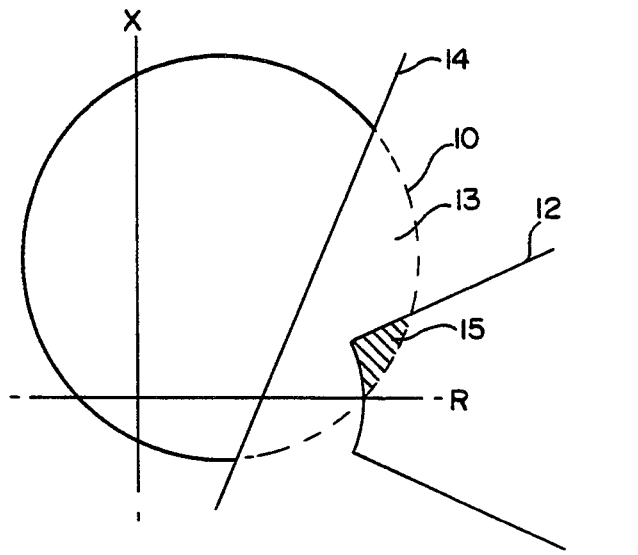
FIG. 1 shows a conventional mho circle characteristic with the load pattern of the transmission line encroaching on the reach of that characteristic.

As briefly discussed above, conventional approaches for preventing load encroachment in distance relays are directed toward changing the shape of the relay characteristic itself. FIG. 1 shows a mho characteristic circle 10 in the impedance plane and a load pattern at 12. Shaded area 15 is the area of encroachment. A blinder element shown at 14 may be added to the relay element which in effect cuts off a substantial portion of the reach of the relay characteristic 10. The cut-off portion 13 encompasses the encroached area 15.

Figure 2:
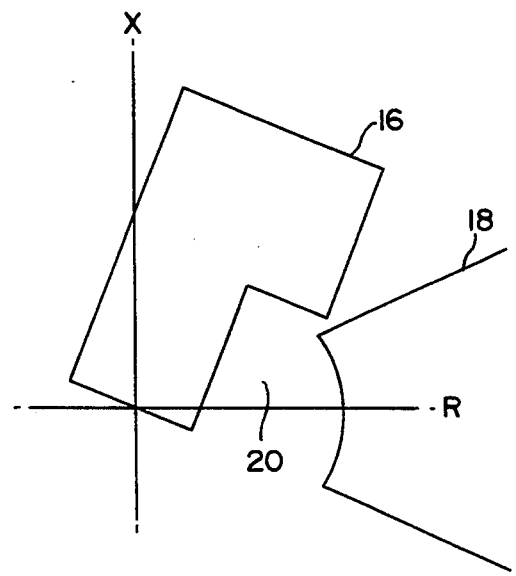
FIG. 2 shows a conventional fancy characteristic which avoids the load pattern of FIG. 1.

The relay characteristic may be formed in another, particular way, such as shown in FIG. 2, to avoid the load pattern, without losing all the area cut off by a blinder embodiment. These are often referred to as "fancy" characteristics. In FIG. 2, the relay characteristic is shown at 16 while the load pattern is shown at 18. Other variations are, of course, possible, including a series of smaller circles or ellipses configured somewhat like an extended figure eight.

In all of these approaches, however, a substantial amount of the coverage of the original mho circle characteristic is lost, which means that a substantial area of potential fault coverage is also lost, so that there will in fact be some fault conditions which are not recognized by the relay, but should be, due to the altered (specially configured) mho characteristic. One such area of missing coverage is shown at 20 in FIG. 2, for illustration.

Figure 3:
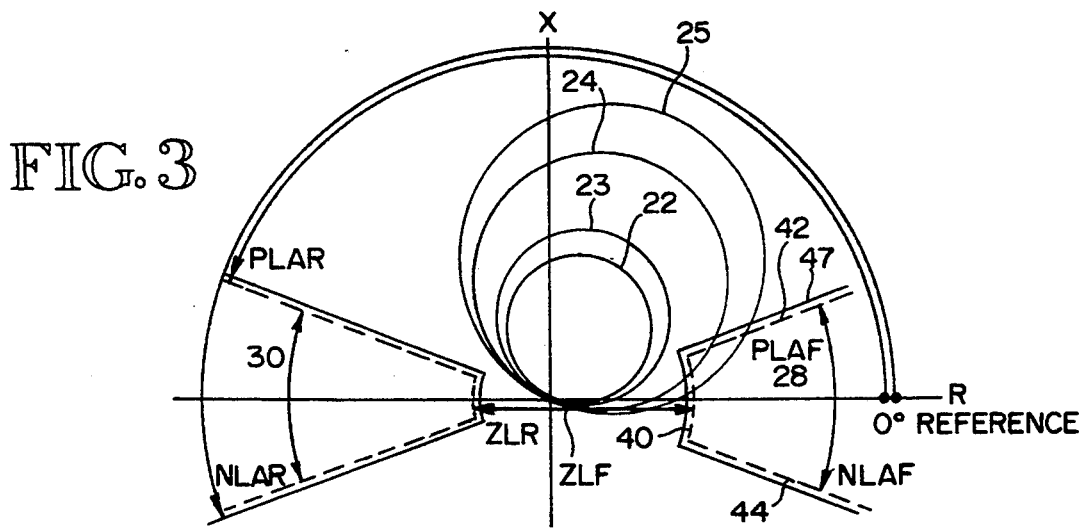
FIG. 3 shows a four-zone characteristic used in the present invention.

The technique of the present invention is illustrated in FIG. 3. FIG. 3 shows a four-zone coverage characteristic involving mho circles 22–25. In this case, the extreme load pattern 28 (forward), shown by dotted lines, encroaches upon two zones. Load pattern 30 (reverse) does not encroach. FIG. 3 shows four-zone coverage because this is a typical relay element coverage used in actual protection schemes. It should be understood that the present technique is useful with a different number of zones and with different load patterns.

In the present invention, the relay calculates the apparent complex impedance of the line, i.e. z, comprising R+JX, by dividing the complex voltage on the line by the complex current and then compares that value of z against the load pattern, both forward and reverse. If the complex impedance Z is within the area defined by either load pattern, then the relay is designed to conclude that particular impedance condition on the line is due to load, and the operation of the mho elements which would otherwise indicate that a trip should occur are blocked, preventing tripping of the circuit breaker for the portion of the transmission line covered by the relay.

If the complex impedance is outside both of the load patterns, then the mho elements are permitted to operate normally, producing a trip signal to the circuit breaker if the impedance is within the circle. Since the mho elements are blocked for the load pattern area, it is conceivable that an actual fault condition could be shielded; however, such an occurrence is very unlikely. In any event, the area of lost coverage of the present invention is significantly smaller than the lost area of previous techniques. This is because the technique of the present invention produces a characteristic which is very closely matched to the load pattern, instead of modifying an operating characteristic to avoid the load pattern.

Figure 4:
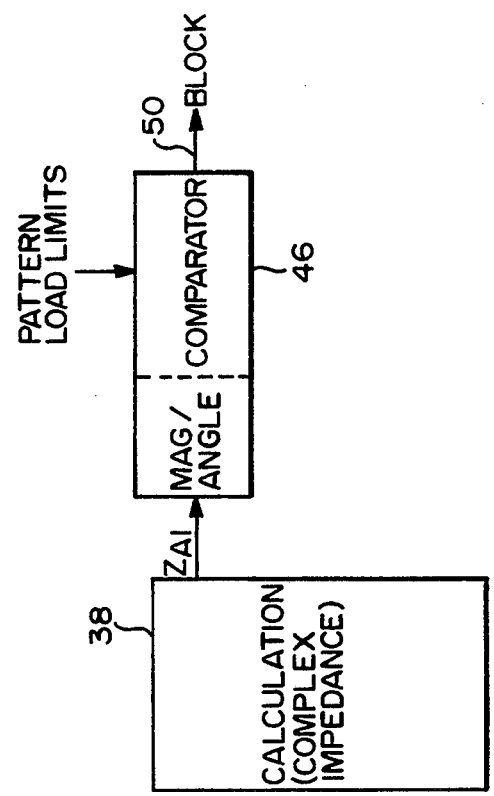
FIG. 4 shows a basic computational block diagram for implementing the technique of the present invention.
Figure 4:
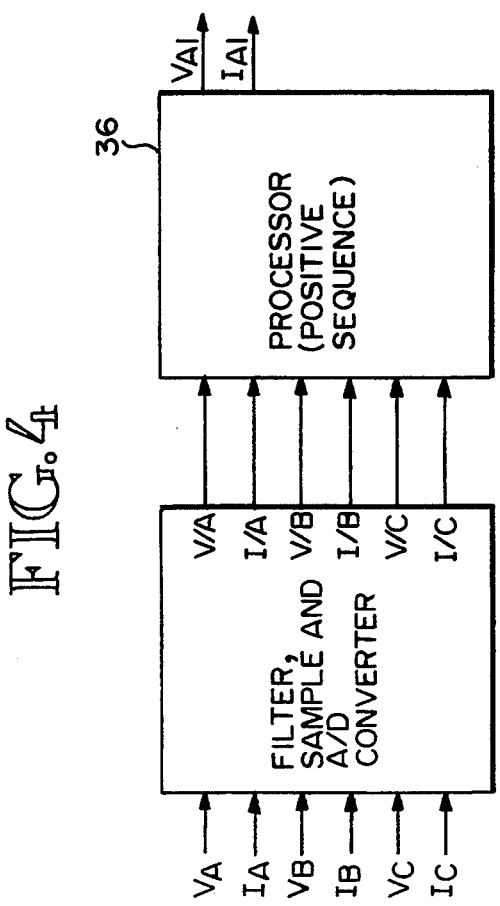

The load encroachment technique of the present invention is normally implemented with conventional distance relay elements in a digital distance relay. Referring to FIG. 4, the voltage and current for each of the three phases (A, B & C) in a three-phase transmission line signal are obtained. These voltages/currents are shown as VA and IA, VB and IB, VC and IC in FIG. 4. Phasor representations of these voltages and currents are first obtained and the positive sequence components thereof are then obtained, shown as VA1, IA1 (for A phase) in FIG. 4. Conventional processing elements shown representationally at 36 produce these positive sequence phasor components. The positive sequence complex impedances are then calculated at the relay location. This calculation is represented by block 38. The result of this is ZA1. ZA1 is then tested against the load pattern.

Referring to FIG. 3, the load pattern 28 (dotted lines) is defined in one way by a magnitude line 40 (magnitude of ZLF) and two radiating lines (angle lines) 42 and 44, above and below the R axis in the impedance plane diagram of FIG. 3 at an angle $\pm\Theta$ (PLAF and NLAF) which are calculated from the known power factor of the power signal on the transmission line. The power factor (PF) is the cosine of the angle between the voltage and the current of the signal. The complex power is equal to P+JQ, where P equals the real power and Q equals the complex power. The magnitude of the complex power (S) may be calculated from the line-to-line voltage and the line current as follows:

$$S = \sqrt{3} \cdot V_{PP} \cdot I_L.$$

The impedance may then be calculated from the line-neutral voltage and the line current as follows:

$$Z = \frac{V_{LN}}{I_L}.$$

The angle between the voltage and the current may then be calculated using the known power factor: $\Theta = COS^{-1}(PF)$.

Assuming that the voltage $V_{pp}$ is at zero degrees, the angle of the current may be calculated from the power factor. A "leading" power factor results in a positive current angle, while a lagging power factor results in a negative current angle. For $V_{pp}$ of 230 KV, an S of 500 MVA, and a PF of 0.8 (lagging):

$$\Theta = COS^{-1}(0.8) = 36.87°$$

$$I_L = \frac{S}{\sqrt{3} \cdot V_{PP}} = \frac{500 \text{ MVA}}{\sqrt{3} \cdot 230 \text{ KV}} = 1255 \text{ amp}$$

$$V_{LN} = \frac{V_{PP}}{\sqrt{3}} = \frac{230 \text{ KV}}{\sqrt{3}} = 132.8 \text{ KV}$$

Since $I = -36.87°$ because of a lagging PF, $$Z = \frac{V_{LN} \angle 0°}{I \angle 36.87°} = \frac{132.8 \text{ Kv} \angle 0°}{1255 \angle -36.87°} = 105.8 \, \Omega \angle 36.87°$$

Hence, the magnitude (ZLF) of line 40 is 105.8 $\Omega$ while the power factor lines 42,44 are at $\pm$ 36.87° (angles PLAF and NLAF), respectively.

The complex impedance of Z1 is processed to a magnitude and angle form, i.e. $Z \angle \Theta$, and then compared with $Z \angle \Theta$ limits of the load, in block 46. In the embodiment shown, $Z \angle \Theta$ is compared with a boundaried load pattern (solid line 47 in FIG. 3), i.e., there is a boundary or margin between the actual load pattern and the load encroachment characteristic. This is to provide a safety margin relative to the load region. If the magnitude and angle of ZA1 is within the boundaried load pattern, then a signal is applied on output 50 to block the distance relay elements associated with that current phase, so that an otherwise resulting trip signal will not be applied to the circuit breaker.

It should be understood that while the distance relay embodiment described above uses relay elements having mho characteristics to determine transmission line faults, the load encroachment technique described herein can apply to other relay element characteristics. Further, while the invention has been described as being used with distance relays, it is also useful with overcurrent relays. In addition, while the embodiment shown describes the load pattern as wedge shaped, it should be understood that the load pattern could be defined in rectangular coordinates, and need not necessarily be wedge shaped, although the wedge shape is appropriate in defining a minimum load magnitude and power factor angles associated with the load.

A preferred embodiment of the above-identified invention has thus been disclosed. It should be understood, however, that various changes, substitutions and modifications may be made in such embodiment without departing from the spirit of the invention which is defined by the claims which follow.

What is claimed is:

1. A system for preventing a protective relay useful in protecting power transmission lines from indicating a fault on the transmission line in response to load, comprising:

means for measuring voltage and current on the transmission line;
means for determining positive sequence components of said measured voltage and current;
means for calculating positive sequence impedance at the relay location on the transmission line from said positive sequence voltage and current;
means for determining a pattern of load impedance on the transmission line relative to the relay, the pattern of load impedance defining a selected area in the impedance plane;
means for comparing the calculated impedance at the relay location against a test impedance pattern which is at least substantially similar to the lead impedance pattern; and
means for blocking an output indication from the relay indicative of the presence of a fault on the transmission line if the calculated impedance is within the test impedance pattern.

2. A system of claim 1, wherein the means for measuring the voltage and current includes means for low pass filtering analog voltage and current obtained from the power transmission line, means for periodically sampling the filtered analog voltage and current, and means for converting the sampled analog signals to digital signals.

3. A system of claim 1, wherein the power transmission line has a three-phase power signal thereon and wherein the measured voltage and current include all three phases of the power signal on the transmission line.

4. A system of claim 1, wherein the system is an integral part of a protective relay.

5. A system of claim 4, wherein the protective relay is a distance relay.

6. A system of claim 5, wherein the protective relay is an overcurrent relay.

7. A system of claim 1, wherein the system is capable of being used with a preexisting protective relay.

8. A system of claim 7, wherein the protective relay is a distance relay.

9. A system of claim 7, wherein the protective relay is an overcurrent relay.

10. A system of claim 1, wherein the means for comparing the calculated impedance includes means for converting the calculated impedance into a magnitude and phase representation, and wherein the test pattern is in a magnitude and phase representation.

11. A system of claim 1, wherein the load pattern extends above and below the R axis in the impedance plane and has a form of a wedge.

12. A system of claim 1, wherein the load pattern includes forward and rear portions and wherein the forward portion is different in configuration than the rear portion.

13. A method for preventing a protective relay useful in protecting power transmission lines from indicating a fault on the transmission line in response to load, comprising the steps of:

measuring the voltage and current on the transmission line;
determining positive sequence components of said measured voltage and current;
calculating the positive sequence impedance at the relay location on the transmission line from said positive sequence voltage and current;
determining a pattern of load impedance on the transmission line relative to the relay, the pattern of load impedance defining a selected area in the impedance plane;
comparing the calculated impedance at the relay location against a test impedance pattern which is at least substantially similar to the lead impedance pattern; and
blocking an output indication from the relay indicative of the presence of a fault on the transmission line if the calculated impedance is within the test impedance pattern.

14. A method of claim 13, including the step of converting the calculated impedance into a magnitude and phase angle representation and wherein the load pattern is also in the form of a magnitude and phase angle representation.

15. A method of claim 13, where the voltage and current on the transmission line are in analog form, and wherein the step of measuring includes the step of filtering and sampling the analog voltage and current and converting the analog voltage and current to a digital representation.

16. A method for defining a load pattern on a power transmission line in the impedance plane, comprising the steps of:

determining the angle between voltage and current on the transmission line using the known power factor of a power signal on the transmission line;
determining a value of line current and a value of line-neutral voltage on the transmission line;
calculating load impedance on the transmission line in magnitude and phase angle formats from the line current and the line-neutral voltage; and
defining the load pattern in the impedance plane from said magnitude and phase angle information.

17. A method of claim 16, wherein the load impedance magnitude determines an inner end boundary of the load pattern and the load impedance phase angle determines upper and lower boundaries of the load pattern extending radially outward from the inner end boundary.

18. A method of claim 16, wherein the line current is equal to $$\frac{S}{\sqrt{3} \cdot V_{PP}},$$

where S equals the magnitude of the complex power and $V_{PP}$ is the line-to-line voltage on the transmission line, and wherein the line-to-neutral voltage equals $$\frac{V_{PP}}{\sqrt{3}}.$$

* * * * *

UNITED STATES PATENT AND TRADEMARK OFFICE
CERTIFICATE OF CORRECTION

PATENT NO. : 5,367,426
DATED : November 22, 1994
INVENTOR(S) : Edmund O. Schweitzer III It is certified that error appears in the above-identified patent and that said Letters Patent is hereby corrected as shown below:

Claims 1 and 6 should read as follows:

In claim 1, col. 5, line 23, the word "lead" should be --load--.

In Claim 6, col. 5, line 45, the numeral "5" should be --4--.

Signed and Sealed this

Twenty-first Day of February, 1995

Attest:

BRUCE LEHMAN

Attesting Officer    Commissioner of Patents and Trademarks

(12) EX PARTE REEXAMINATION CERTIFICATE (6306th)
United States Patent
Schweitzer, III

(10) Number: US 5,367,426 C1
(45) Certificate Issued: Jul. 22, 2008

(54) DISTANCE RELAY WITH LOAD ENCROACHMENT PROTECTION, FOR USE WITH POWER TRANSMISSION LINES

(75) Inventor: Edmund O. Schweitzer, III, Pullman, WA (US)

(73) Assignee: Schweitzer, Engineering Laboratories, Inc., Pullman, WA (US)

Reexamination Request:
No. 90/007,658, Aug. 5, 2005

Reexamination Certificate for:
Patent No.: 5,367,426
Issued: Nov. 22, 1994
Appl. No.: 07/960,763
Filed: Oct. 14, 1992

Certificate of Correction issued Feb. 21, 1995.

(51) Int. Cl.
*H02H 7/26* (2006.01)

(52) U.S. Cl. .................... 361/80; 324/522
(58) Field of Classification Search ............ 361/80, 361/188; 324/522, 525, 512
See application file for complete search history.

(56) References Cited

U.S. PATENT DOCUMENTS

| | | | |
|---|---|---|---|
| 3,569,785 A | 3/1971 | Durbeck et al. | |
| 3,731,152 A | 5/1973 | Rockefeller, Jr. | |

(Continued)

FOREIGN PATENT DOCUMENTS

| | | | |
|---|---|---|---|
| EP | 0 316 204 A2 | 5/1989 |
| EP | 0 378 786 A2 | 7/1990 |
| EP | 0 577 228 A1 | 1/1994 |
| EP | 0 579 340 A1 | 1/1994 |
| JP | 52-118548 | 10/1977 |
| JP | 52-124150 | 10/1977 |
| JP | 53-062142 | 6/1978 |
| JP | 63-283418 | 11/1988 |
| JP | 02-023025 | 1/1990 |
| JP | 02-214417 | 8/1990 |
| JP | 03-183318 | 8/1991 |
| JP | 04-029518 | 1/1992 |
| JP | 04-087514 | 3/1992 |
| JP | 04-140016 | 5/1992 |
| JP | 04-140017 | 5/1992 |
| JP | 04-344119 | 11/1992 |
| JP | 05-022844 | 1/1993 |
| JP | 05-207639 | 8/1993 |
| JP | 05-236640 | 9/1993 |
| WO | WO 85/00932 A1 | 2/1985 |
| WO | WO 92/04635 A1 | 3/1992 |

OTHER PUBLICATIONS

Cook ("Analysis of Distance Protection" textbook pp. 160–163, published by Research Studies Press, 1985).*
John J. Grainger and William D. Stevenson "Power System Analysis", p. 24 of textbook published by McGraw Hill Inc 1994.*
Gilcrest et al. (High speed distance relaying using a digital computer I—System Description, IEEE Transactions Power Apparatus and Systems, vol. PAS–91, pp. 1235–1243, May/Jun. 1972).*
Cook ("Analysis of Distance Protection" textbook p. 109, published by Research Studies press, 1985).*

(Continued)

*Primary Examiner*—Anjan K. Deb

(57) ABSTRACT

Voltage and current on a power transmission line are first obtained, filtered and converted to digital representations. The positive sequence components fo the voltage and current are determined and the impedance at the relay is then calculated from those positive sequence voltages and currents. The positive sequence impedance is converted into a magnitude and phase angle representation and then compared against a load pattern which is also represented by magnitude and phase angle representations. If the calculated impedance at the relay is within the load impedance pattern, the distance relay is prevented, i.e. blocked, from sending an output signal to trip a circuit breaker protecting the transmission line.

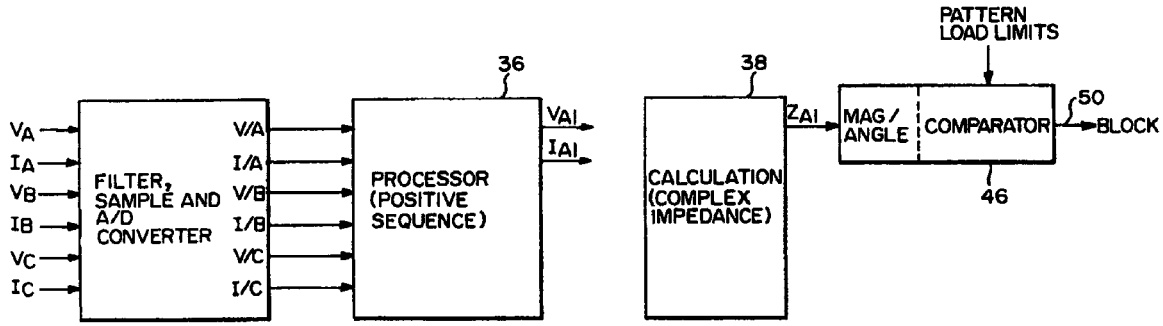

U.S. PATENT DOCUMENTS

| | | | |
|---|---|---|---|
| 3,890,544 | A | | 6/1975 | Chamia |
| 4,091,433 | A | | 5/1978 | Wilkinson |
| 4,092,690 | A | * | 5/1978 | Wilkinson ................... 361/80 |
| 4,092,691 | A | | 5/1978 | Williams |
| 4,148,087 | A | | 4/1979 | Phadke |
| 4,161,011 | A | | 7/1979 | Wilkinson |
| 4,228,398 | A | | 10/1980 | Fiorentzis |
| 4,308,565 | A | | 12/1981 | de Mesmaeker et al. |
| 4,344,143 | A | | 8/1982 | Kurosawa et al. |
| 4,352,137 | A | | 9/1982 | Johns |
| 4,357,666 | A | * | 11/1982 | Matsushima et al. ........ 700/293 |
| 4,405,966 | A | | 9/1983 | Cavero |
| 4,420,788 | A | | 12/1983 | Wilkinson et al. |
| 4,433,353 | A | | 2/1984 | Wilkinson |
| 4,458,285 | A | * | 7/1984 | De Mesmaeker ............ 361/79 |
| 4,484,245 | A | | 11/1984 | McFall |
| 4,635,157 | A | | 1/1987 | Ebisaka |
| 4,755,903 | A | | 7/1988 | Kotani |
| 4,785,249 | A | | 11/1988 | Yoshida |
| 4,821,137 | A | * | 4/1989 | Wilkinson ................... 361/80 |
| 4,825,323 | A | | 4/1989 | Wilkinson |
| 4,835,651 | A | | 5/1989 | Li et al. |
| 4,841,405 | A | | 6/1989 | Udren |
| 4,972,290 | A | * | 11/1990 | Sun et al. ...................... 361/64 |
| 5,140,492 | A | | 8/1992 | Schweitzer, III |

OTHER PUBLICATIONS

Paduraru, Cristian; "Automating Testing of Protective Relays Using Advanced Visual Test Software"; IEEE/PES Transmission and Distribution Conference and Exhibition; 2002; p. 1738–41; IEEE, Piscataway, NJ, USA.

Humpage, W.D. et al.; "Discriminating–Response Indices for Distance Protection"; Journal of Electrical and Electronics Engineering, Australia; Jun. 1983; vol. 3, No. 2; p. 114–25; Australia.

Breingan, W.D. et al.; "A New Digital Technique for Transmission Line Protection"; 1977 Control of Power Systems Conference and Exposition; Mar. 14–16, 1977; p. 31; IEEE, New York, NY, USA.

Mochinaga, Y. et al.; "Development of AC Feeding Circuit Load Zone Measuring Device (R–Z Analyzer)"; Tetsudo Soken Hokoku (RTRI Report); Railway Technical Research Institute; 1997; vol. 11, No. 5; p. 49–54; Japan.

Express Search, Inc.; Literature Search Report; Jul. 22, 2003; USA.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 16–18 are cancelled.

Claims 1, 10, 13 and 14 are determined to be patentable as amended.

Claims 2–9, 11, 12 and 15, dependent on an amended claim, are determined to be patentable.

1. A system for preventing a protective relay useful in protecting power transmission lines from indicating a fault on the transmission line in response to load, comprising:
   means for measuring voltage and current on the transmission line;
   means for determining positive sequence components of said measured voltage and current;
   means for calculating positive sequence impedance at the relay location on the transmission line from said positive sequence voltage and current;
   means for determining a pattern of load impedance on the transmission line relative to the relay, [the pattern of] *said* load impedance *pattern* defining a selected area in the impedance plane;
   means for [comparing the calculated impedance at the relay location against] *forming* a test impedance pattern which is at least substantially similar to [the] *said* load impedance pattern; [and]
   *means for comparing said calculated positive sequence impedance at the relay location against said test impedance pattern; and*
   means for blocking an output indication from the relay indicative of the presence of a fault on the transmission line if the calculated *positive sequence* impedance is within [the] *said* test impedance pattern.

10. A system of claim 1, wherein the means for comparing the calculated *positive sequence* impedance includes means for converting the calculated *positive sequence* impedance into a magnitude and phase representation, and wherein the test *impedance* pattern is in a magnitude and phase representation.

13. A method for preventing a protective relay useful in protecting power transmssion lines from indicating a fault on the transmission line in response to load, comprising the steps of:
   measuring the voltage and current on the transmission line;
   determining positive sequence components of said measured voltage and current;
   calculating the positive sequence impedance at the relay location on the transmission line from said positive sequence voltage and current;
   determining a pattern of load impedance on the transmission line relative to the relay, [the pattern of] *said* load impedance *pattern* defining a selected area in the impedance plane;
   [comparing the calculated impedance at the relay location against] *forming* a test impedance pattern which is at least substantially similar to [the] *said* load impedance pattern; [and]
   *comparing said calculated positive sequence impedance at the relay location against said test impedance pattern; and*
   blocking an output indication from the relay indicative of the presence of a fault on the transmission line if the calculated *positive sequence* impedance is within [the] *said* test impedance pattern.

14. A method of claim 13, including the step of converting the calculated *positive sequence* impedance into a magnitude and phase angle representation and wherein the load *impedance* pattern is also in the form of a magnitude and phase angle representation.

\* \* \* \* \*